(12) United States Patent
Park

(10) Patent No.: US 9,318,016 B2
(45) Date of Patent: Apr. 19, 2016

(54) MOBILE TERMINAL AND DEVICE CONTROL METHOD FOR THE SAME

(71) Applicant: Samsung Electronics Co., Ltd., Suwon-si, Gyeonggi-do (KR)

(72) Inventor: Bum Sun Park, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 59 days.

(21) Appl. No.: 13/854,239

(22) Filed: Apr. 1, 2013

(65) Prior Publication Data
US 2013/0225154 A1   Aug. 29, 2013

Related U.S. Application Data

(63) Continuation of application No. 12/229,864, filed on Aug. 27, 2008, now Pat. No. 8,423,163.

(30) Foreign Application Priority Data

Aug. 28, 2007  (KR) .......................... 10-2007-0086622

(51) Int. Cl.
| | |
|---|---|
| G05B 15/00 | (2006.01) |
| G08C 17/02 | (2006.01) |
| H04L 12/28 | (2006.01) |
| H04M 1/725 | (2006.01) |

(52) U.S. Cl.
CPC .............. *G08C 17/02* (2013.01); *H04L 12/282* (2013.01); *H04L 12/2809* (2013.01);
(Continued)

(58) Field of Classification Search
CPC ............... G08C 2201/91; G08C 17/02; G08C 2201/20; G08C 2201/30; H04N 5/44582; H04L 12/2829; H04L 12/2809; H04L 12/282; H04L 2012/2841; H04M 1/72533; H04M 1/72525; H04M 1/7253; H04M 2250/22
USPC .................. 700/15, 17, 83; 340/539.1–539.19
See application file for complete search history.

(56) References Cited

U.S. PATENT DOCUMENTS 6,445,290 B1 * 9/2002 Fingal et al. ............. 340/539.32
6,885,362 B2    4/2005 Suomela
(Continued)

FOREIGN PATENT DOCUMENTS

| | | |
|---|---|---|
| CN | 1735114 A | 2/2006 |
| WO | WO 01/71685 A1 | 9/2001 |
| WO | WO 2007/024271 A1 | 3/2007 |

OTHER PUBLICATIONS

European Search Report dated Jul. 15, 2011 in connection with European Patent Application No. 08 16 2606.
(Continued)

*Primary Examiner* — Kenneth M Lo
*Assistant Examiner* — Chad Rapp

(57) ABSTRACT

A mobile terminal and device control method for the same are disclosed. The device control method for a mobile terminal having a touch screen, includes: downloading, during registration of a device capable of short-range wireless communication operating in a short-range communication mode, a user interface (UI) of the device; finding a list of registered devices, displaying the found list, selecting a device from the displayed list, calling the selected device, and connecting to the selected device; and displaying a device UI of the connected device on the touch screen, and controlling the connected device through the displayed device UI according to a touch operation. Electronic devices within a range can be easily and accurately controlled using a mobile terminal having a touch screen. In particular, the use of a user interface downloaded from an electronic device enables easy control of full functions of the device, enhancing user convenience.

21 Claims, 7 Drawing Sheets

(52) U.S. Cl.
CPC ....... *H04M 1/7253* (2013.01); *H04M 1/72525* (2013.01); *H04M 1/72533* (2013.01); *G08C 2201/20* (2013.01); *G08C 2201/30* (2013.01); *G08C 2201/91* (2013.01); *H04L 2012/2841* (2013.01); *H04M 2250/22* (2013.01)

(56) References Cited

U.S. PATENT DOCUMENTS

| | | | |
|---|---|---|---|
| 7,702,739 B1 * | 4/2010 | Cheng et al. | 709/207 |
| 7,730,223 B1 | 6/2010 | Bavor et al. | |
| 7,831,930 B2 | 11/2010 | Dresti et al. | |
| 7,864,043 B2 | 1/2011 | Camp, Jr. et al. | |
| 2001/0048373 A1 * | 12/2001 | Sandelman | 340/825.52 |
| 2002/0046311 A1 * | 4/2002 | Kageyama | 710/105 |
| 2005/0172321 A1 | 8/2005 | Kakuda | |
| 2007/0050054 A1 | 3/2007 | Sambandam Guruparan et al. | |

OTHER PUBLICATIONS

Office Action dated May 25, 2011 in connection with Chinese Patent Application No. 200810213353.4.

* cited by examiner

MOBILE TERMINAL AND DEVICE CONTROL METHOD FOR THE SAME

CROSS-REFERENCE TO RELATED APPLICATIONS

This application is a continuation of U.S. patent application Ser. No. 12/229,864, filed Aug. 27, 2008, entitled "MOBILE TERMINAL AND DEVICE CONTROL METHOD FOR THE SAME", which claims priority to an application entitled "MOBILE TERMINAL AND DEVICE CONTROL METHOD FOR THE SAME" filed in the Korean Intellectual Property Office on Aug. 28, 2007 and assigned Ser. No. 2007-0086622, the contents of which are incorporated herein by reference.

TECHNICAL FIELD OF THE INVENTION

The present invention relates generally to a mobile terminal and, more particularly, to a mobile terminal and device control method for the same that enable easy control of an external device connected through short-range wireless communication using a user interface displayed on a touch screen.

BACKGROUND OF THE INVENTION

Normally, a user utilizes remote controllers to easily manipulate electronic devices such as a television, video player, audio player and DVD player. Remote control is used to control the function of these devices.

In this case, the user may be inconvenienced by having to maintain suitable distances for remote control and to find a remote controller paired with a particular electronic device to be controlled. In addition, only buttons of a remote controller can be used to input a control command, restricting versatile control of the corresponding device.

With popularization of home networks for home automation, the number of electronic devices to be controlled has increased and electronic devices without a remote control capability have evolved into those with a remote control capability. Hence, it is necessary to develop a technique enabling the user to easily control and manipulate a number of electronic devices in an integrated manner.

SUMMARY OF THE INVENTION

To address the above-discussed deficiencies of the prior art, it is a primary object to provide a mobile terminal and device control method for the same that enable the user to control the operation of electronic devices connected through short-range wireless communication.

The present invention also provides a mobile terminal and device control method for the same that enable the user to control the operation of electronic devices connected through short-range wireless communication using a user interface displayed on a touch screen.

The present invention further provides a mobile terminal and device control method for the same that enable the user to control the operation of an electronic device connected through short-range wireless communication using a user interface downloaded from the electronic device.

In accordance with an exemplary embodiment of the present invention, there is provided a device control method for a mobile terminal having a touch screen, including: downloading, during registration of a device capable of short-range wireless communication operating in a short-range communication mode, a user interface (UI) of the device; finding a list of registered devices, displaying the found list, selecting a device from the displayed list, calling the selected device, and connecting to the selected device; and displaying a device UI of the connected device on the touch screen, and controlling the connected device through the displayed device UI according to a touch operation.

In accordance with another exemplary embodiment of the present invention, there is provided a device control method for a mobile terminal having a touch screen, including: registering, during a short-range communication mode, a device capable of short-range wireless communication, and finding and displaying a list of registered devices; calling, when a device from the displayed list is selected, the selected device, connecting to the selected device, and downloading a user interface (UI) of the connected device; and displaying the downloaded device UI on the touch screen, and controlling the connected device through the displayed device UI according to a touch operation.

In accordance with another exemplary embodiment of the present invention, there is provided a device control method for a mobile terminal having a touch screen, including: registering, during a short-range communication mode, a device capable of short-range wireless communication, and finding and displaying a list of registered devices; calling, when a device from the displayed list is selected, the selected device, and connecting to the selected device; and displaying a user interface (UI) of the connected device on the touch screen, and controlling the connected device through the displayed device UI according to a touch operation.

In accordance with another exemplary embodiment of the present invention, there is provided a mobile terminal including: a short-range wireless communication module performing short-range wireless communication with devices capable of short-range wireless communication, and downloading user interfaces (UI) from the devices capable of short-range wireless communication during a short-range communication mode; a memory unit storing the downloaded device UIs; a touch screen displaying a UI of a device connected through short-range wireless communication, and receiving a touch event; and a control unit controlling, during the short-range communication mode, the connected device through the displayed device UI according to a touch event.

In accordance with another exemplary embodiment of the present invention, there is provided a mobile terminal including: a short-range wireless communication module performing short-range wireless communication with devices capable of short-range wireless communication; a memory unit storing user interfaces (UI) of the devices capable of short-range wireless communication; a touch screen displaying a UI of a device connected through short-range wireless communication, and receiving a touch event; and a control unit controlling, during a short-range communication mode, the connected device through the displayed device UI according to a touch event.

In a feature of the present invention, electronic devices within a range can be easily and accurately controlled using a mobile terminal having a touch screen. In particular, the use of a user interface downloaded from an electronic device enables easy control of full functions of the electronic device, enhancing user convenience.

Hence, the user can elaborately and accurately control the operation of electronic devices such as a television, computer, video player, and audio player through a user interface displayed on the touch screen of a mobile terminal with a scroll operation, mouse operation, and touch operation.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile terminal.

In the description, the word 'touch' refers to a contact between a finger or stylus of the user and a touch screen, and may be related to a scroll operation, mouse operation, or touch operation (touch event).

For the purpose of description, a mobile communication terminal is described as an example of a mobile terminal of the present invention, however the present invention is not limited to a mobile communication terminal. The mobile terminal of the present invention is a terminal having a touch screen and a short-range wireless module like a Bluetooth module for user convenience, and may be any information and communication appliance or multimedia appliance, such as a mobile communication terminal, cellular phone, wired/wireless phone, portable multimedia player, personal digital assistant, smart phone, or MP3 player. In addition, an electronic device may be a device having a short-range wireless communication module.

Figure 1:
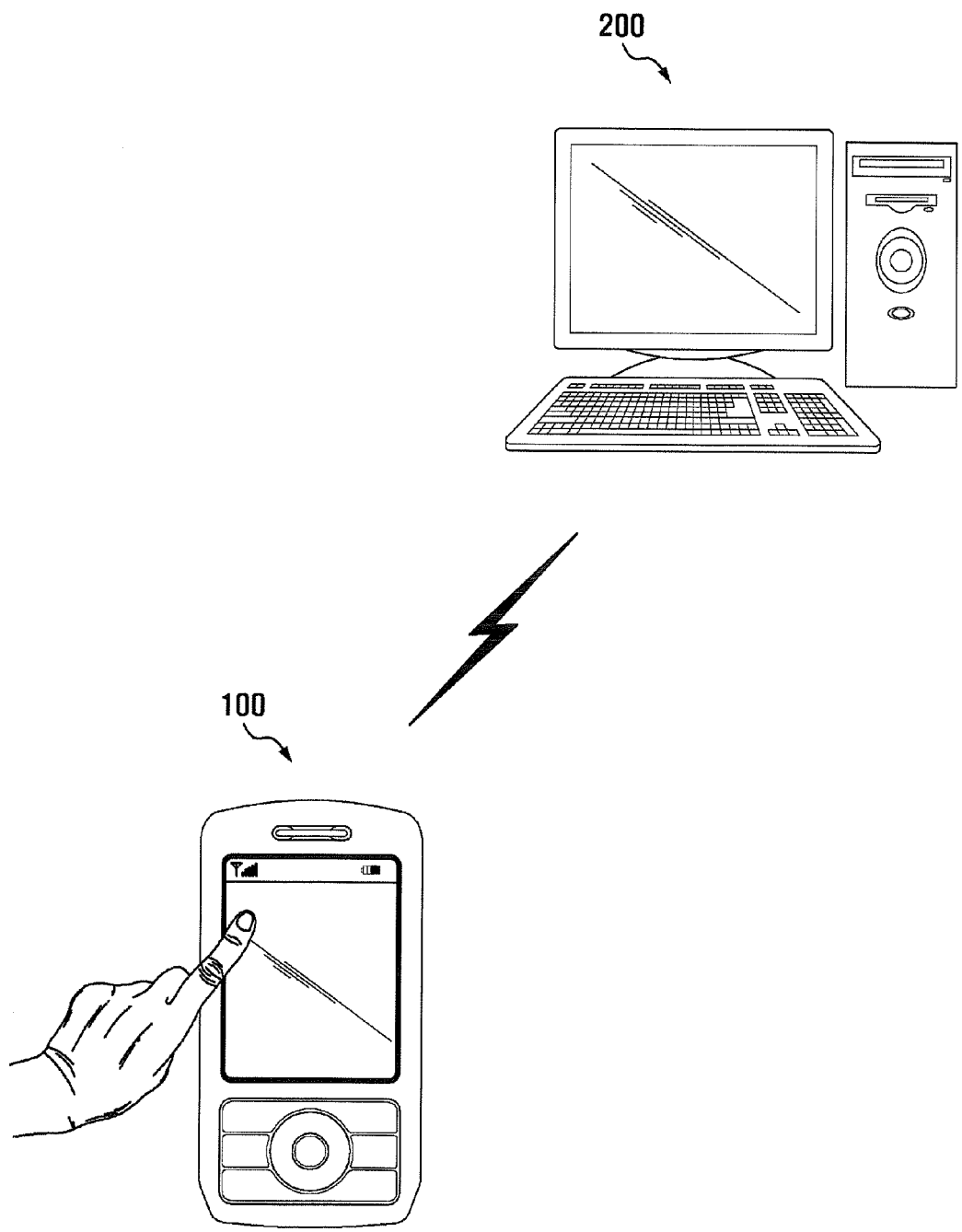
FIG. 1 illustrates a mobile terminal and an electronic device interacting through short-range wireless communication.

FIG. 1 illustrates a mobile terminal 100 and an electronic device 200 interacting through short-range wireless communication.

Referring to FIG. 1, the mobile terminal 100 can provide a voice call service, short message service (SMS), and multimedia message service through a mobile communication system. The mobile terminal 100 may include a camera module to photograph a target object, and a MP3 player module to playback an audio file according to a user request.

Figure 2:
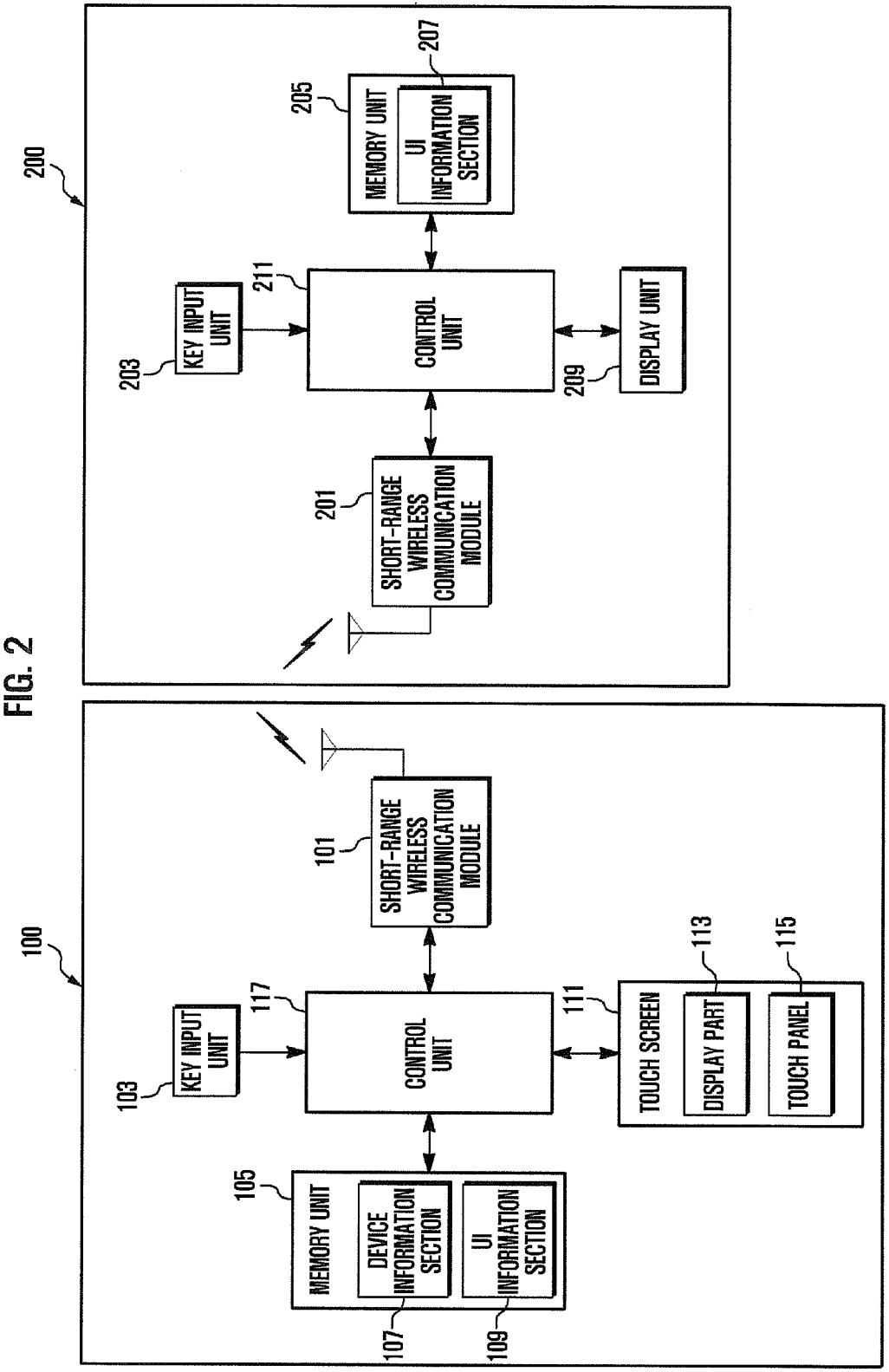
FIG. 2 is a block diagram illustrating a mobile terminal and electronic device according to an exemplary embodiment of the present invention.

The mobile terminal 100 includes a short-range wireless communication module (reference numeral 101 in FIG. 2). The module uses short-range wireless communication based upon Bluetooth, infrared (IrDA) or ZigBee technology, and may use any other short-range wireless communication enabling establishment of a short-range communication channel for signal transmission and reception.

In particular, the Bluetooth protocol operates in the industrial, scientific and medical (ISM) band of 2.4 GHz. The ISM band can be freely used without a license. A lower guard band of 2 MHz wide and an upper guard band of 3.5 MHz wide are provided respectively below and above the 2.4 GHz ISM band to prevent interference with other devices. Bluetooth uses frequency hopping, which divides the ISM band into multiple channels, and changes channels up to 1600 times per second.

The mobile terminal 100 includes a touch screen (reference numeral 111 in FIG. 2). The user can control a device connected through short-range wireless communication using a user interface (UI) displayed on the touch screen. The mobile terminal 100 stores UI function information, which enables the connected device to perform a requested operation in response to the selection of a function through the displayed UI. For example, when the UI of a television is displayed on the mobile terminal 100, selection of the '1' key of the displayed UI may cause the television to tune to the channel '1' mapped through UI function information to the '1' key.

When the mobile terminal 100 connects to a device capable of short-range wireless communication, it downloads the UI of the device. To be more specific, during a short-range communication mode, when the mobile terminal 100 registers a device capable of short-range wireless communication, it may download the UI of the device. During a short-range communication mode, when one of registered devices is selected and a short-range wireless connection to the selected device is made, the mobile terminal 100 may download the UI of the device. The mobile terminal 100 may store UIs of controllable devices in advance. Namely, UIs of devices capable of short-range wireless communication may be pre-stored in the mobile terminal 100 before shipment. When the mobile terminal 100 stores the UI of a device and connects to the device, it may check occurrence of a change in the UI and download the updated UI if a change has occurred.

During the short-range communication mode, the mobile terminal 100 may immediately display the UI of a device recently engaged in short-range wireless communication. That is, the mobile terminal 100 enables the user to readily control a device again by immediately displaying the UI of the device that was recently connected and controlled.

The electronic device 200 is a device such as a television, computer, video player, audio player or DVD player. Like the mobile terminal 100, the electronic device 200 includes a short-range wireless communication module (reference numeral 201 in FIG. 2). When the electronic device 200 is connected to the mobile terminal 100 through short-range wireless communication, the operation of the electronic device 200 is controlled by the mobile terminal 100. The electronic device 200 stores its UI and UI function information in a form transferable to the mobile terminal 100 through short-range wireless communication. When the electronic device 200 connects to the mobile terminal 100 for the first time, it sends the UI to the mobile terminal 100. Then, the electronic device 200 and mobile terminal 100 display the UI on their display units in the same form.

Upon powering on, the electronic device 200 may immediately activate the short-range wireless communication module, search for a registered mobile terminal 100, and send a notification signal to the found mobile terminal 100. That is, when the user turns on the electronic device 200 (for example, to view a television), the electronic device 200 automatically sends a notification signal to the registered mobile terminal 100, in which case the user can easily find the location of the mobile terminal 100 and conveniently control the electronic device 200 using the mobile terminal 100.

Next, the mobile terminal 100 for device control is described. FIG. 2 is a block diagram illustrating the mobile terminal 100 and electronic device 200 according to an exemplary embodiment of the present invention.

Referring to FIG. 2, the mobile terminal 100 of the present invention includes a short-range wireless communication module 101, key input unit 103, memory unit 105, touch screen 111, and control unit 117.

The short-range wireless communication module 101 uses a technology based on Bluetooth, infrared (IrDA) or ZigBee to form a personal area network (PAN) with a device capable of short-range wireless communication, and may use any other short-range wireless communication method enabling establishment of a short-range communication channel for signal transmission and reception. In the present embodiment, the short-range wireless communication module 101 is described as a Bluetooth module.

The short-range wireless communication module 101 performs a series of operations to send and receive a control signal and voice signal through a wireless interface to and from a device capable of short-range wireless communication. In particular, the short-range wireless communication module 101 receives a control signal from the device 200 capable of short-range wireless communication, and forwards the received control signal to the control unit 117. The short-range wireless communication module 101 may also analyze the received control signal. In the short-range communication mode, the short-range wireless communication module 101 receives the UI of the registered device 200 along with UI function information.

The key input unit 103 receives a manipulation signal from the user to control the operation of the mobile terminal 100. In particular, the key input unit 103 receives input signals to transition to the short-range communication mode and to select a device to be controlled.

The memory unit 105 stores programs and data necessary for the operation of the mobile terminal 100. In particular, the memory unit 105 includes a device information section 107 and UI information section 109. When the short-range wireless communication module 101 is a Bluetooth module, the device information section 107 stores information on the registered device 200. The UI information section 109 stores the UI of the device 200 and the associated UI function information. The UI refers to items or formats that are displayed on the touch screen 111 to control the operation of the related device 200. The UI function information is mapping information that enables the device 200 to operate according to selection of an item of the displayed UI.

The device information section 107 and UI information section 109 cooperate with each other, and store the information on the UI of the device 200 together in an associated format. In FIG. 2, the device information section 107 and UI information section 109 are separately formed in the memory unit 105; however, they may also be formed as a single entity.

The touch screen 111 includes a display part 113 and touch panel 115. The touch screen 111 acts as an input means. The display part 113 displays states of the mobile terminal 100. The display part 113 includes a substrate of liquid crystal display (LCD) devices, an LCD controller for controlling LCD devices, and a video memory for temporarily storing video data. The touch panel 115 is installed at a surface of the display part 113, and includes a touch sensing part and a signal conversion part. The touch sensing part detects occurrence of a touch by sensing a change in a physical quantity such as resistance or electrostatic capacity. The signal conversion part converts the sensed change in the physical quantity into a touch signal.

In particular, the touch screen 111 visually displays various information related to states and operations of the mobile terminal 100. To control the device 200 connected through short-range wireless communication, the touch screen 111 displays the UI of the device 200. The UI may be displayed on the touch screen 111 of the mobile terminal 100 and on a display unit 209 of the device 200 in the same form.

The control unit 117 controls the overall operation of the elements of the mobile terminal 100. In particular, the control unit 117 controls the device 200 connected through short-range wireless communication. During the short-range communication mode, when the control unit 117 registers the device 200, it downloads the UI of the device 200. That is, when the control unit 117 registers a device capable of short-range wireless communication and displays the registered device on the touch screen 111, it downloads the UI of the device. The control unit 117 may store the downloaded UI in the UI information section 109 of the memory unit 105.

During the short-range communication mode, the control unit 117 searches for a registered device list and displays devices of the list on the touch screen 111 if the list is not empty. At this time, each device is displayed together with an indicator of the presence of the UI thereof, indicating that the device was once controlled by the mobile terminal 100 and the UI of the device is stored in the UI information section 109 of the memory unit 105.

The control unit 117 enables the user to control a device using a displayed device UI. The device is controlled through a scrolling operation, mouse operation, and touch operation in addition to button inputs. For example, when the device 200 connected through short-range wireless communication is a computer, which is being used for movie viewing or music listening, the user can finely and accurately control the volume or play operation using the above-described features.

Upon transitioning to the short-range communication mode, the control unit 117 may immediately display the UI of a device 200 recently engaged in short-range wireless communication. That is, the control unit 117 enables the user to readily control a device 200 again by immediately displaying the UI of the device 200 that was recently connected and controlled.

When a device 200 is turned on, the control unit 117 may output an alert signal. That is, when the device 200 that was recently engaged in short-range wireless communication is turned on, the control unit 117 receives a notification signal from the device 200. Thus, when the user turns on a device 200, the user can easily find the location of the mobile terminal 100 for control of the operation of the device 200.

Referring to FIG. 2, the device 200 of the present invention includes a short-range wireless communication module 201, key input unit 203, memory unit 205, display unit 209, and control unit 211.

The short-range wireless communication module 201 uses a technology based on Bluetooth, infrared (IrDA) or ZigBee to form a personal area network (PAN) with the mobile terminal 100, and may use any other short-range wireless communication method enabling establishment of a short-range communication channel for signal transmission and reception. In the present embodiment, the short-range wireless communication module 201 is described as a Bluetooth module.

The short-range wireless communication module 201 may send the UI of the device 200 to the mobile terminal 100 upon reception of a registration request from the mobile terminal 100. The short-range wireless communication module 201 may also send the UI of the device 200 upon request from the mobile terminal 100. Preferably, the sent UI has the same format as that displayed on the display unit 209 of the device 200. The UI and associated UI function information are sent together.

The key input unit 203 receives a manipulation signal from the user for controlling the operation of the device 200. The key input unit 203 may be excluded from the device 200 depending upon the type thereof. The key input unit 203 can be used to turn on or off the device 200.

The memory unit 205 stores programs and information necessary for the operation of the device 200. In particular, the memory unit 205 includes a UI information section 207, which stores the UI of the device 200 and associated UI function information. Like the memory unit 105 of the mobile terminal 100, the memory unit 205 may include a terminal information section to store information on the registered mobile terminal 100.

The display unit 209 visually displays various information related to states and operations of the device 200. For example, if the device 200 is a television, the display unit 209 displays a broadcast carried on a selected channel. When the device 200 is controlled by the mobile terminal 100, the display unit 209 displays the same UI as that displayed on the touch screen 111 of the mobile terminal 100.

The control unit 211 controls the overall operation of the elements of the device 200. In particular, upon reception of a registration request from the mobile terminal 100, the control unit 211 sends the UI stored in the UI information section 207 of the memory unit 205 to the mobile terminal 100. The control unit 211 performs an operation according to a control signal from the mobile terminal 100 connected through short-range wireless communication.

Figure 3A:
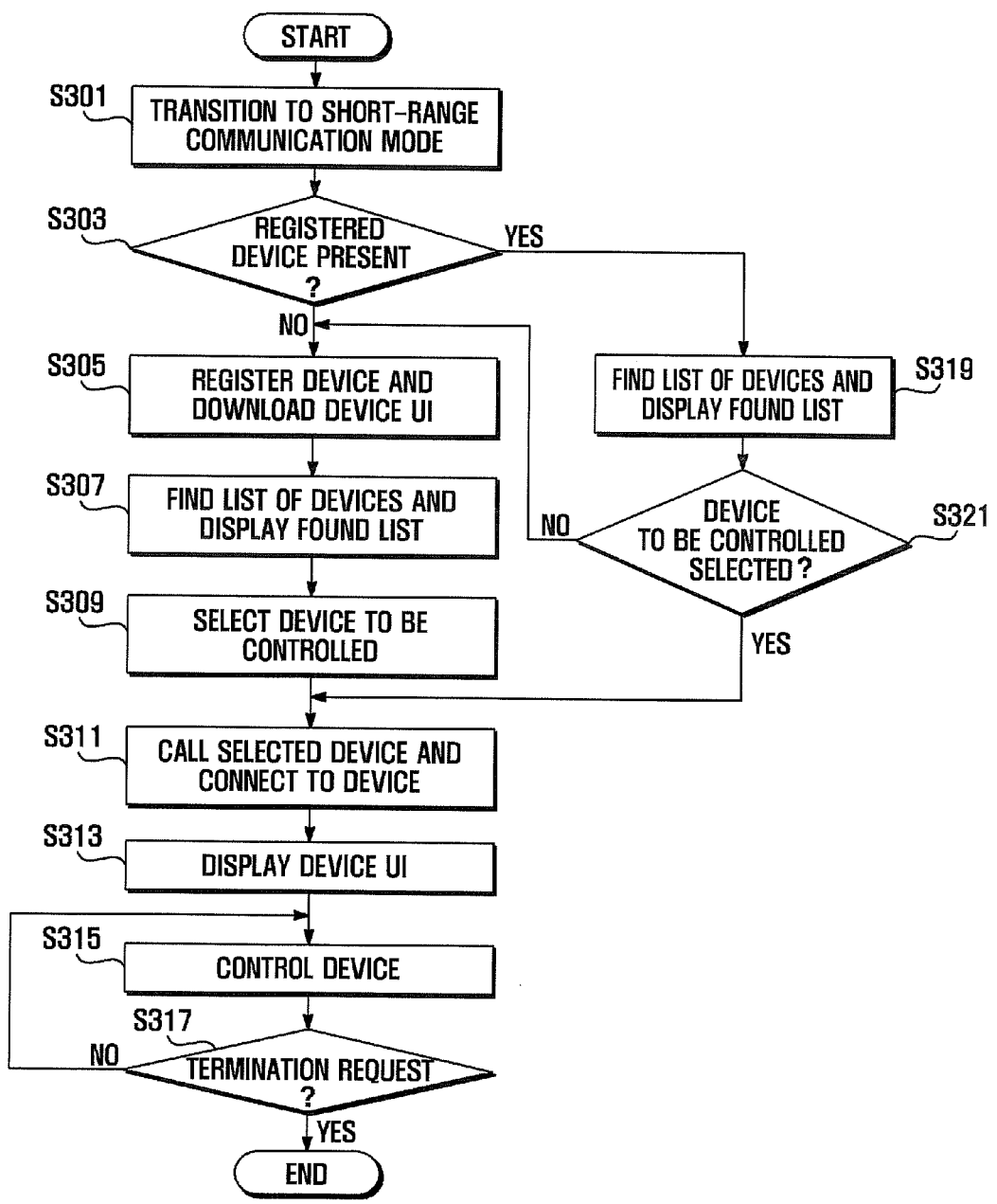
FIG. 3A is a flowchart illustrating a device control method of a mobile terminal according to another exemplary embodiment of the present invention.

Next, a device control method of the mobile terminal is described. FIG. 3A is a flowchart illustrating a device control method according to another exemplary embodiment of the present invention.

Referring to FIGS. 2 and 3A, in response to a request from the user, the control unit 117 of the mobile terminal 100 transitions to the short-range communication mode (S301).

The user can select a menu item or option causing the mobile terminal to transition to the short-range communication mode. In the present embodiment, the short-range wireless communication module 101 is described as a Bluetooth module.

The control unit 117 checks for the presence of a registered device (S303). That is, the control unit 117 checks for the presence of information on a registered device recently engaged in short-range wireless communication. The information on a registered device is stored in the device information section 107 of the memory unit 105. The UI and UI function information of the registered device is stored in the UI information section 109 of the memory unit 105.

If a registered device is not present, the control unit 117 registers a device capable of short-range wireless communication and downloads the UI of the device (S305). During registration, the device capable of short-range wireless communication with the mobile terminal 100 sends its UI to the mobile terminal 100. The control unit 117 stores the downloaded device UI in the UI information section 109. At this time, the device UI is mapped to device information stored in the device information section 107. The storage of a downloaded device UI removes inconvenience caused by repeated downloads of the device UI during registration and reduces the corresponding delay time. Alternatively, to preserve the capacity of the memory unit 105, the control unit 117 may temporarily store the downloaded device UI in a buffer and remove the device UI after controlling the corresponding device.

The control unit 117 finds a list of registered devices and displays the list (S307), and selects a device on the list to be controlled according to a user input (S309). When a list of registered devices capable of short-range wireless communication is displayed, the user selects a device on the list to be controlled. Thereafter, the control unit 117 calls the selected device and connects to the device through short-range wireless communication (S311).

The control unit 117 displays the UI of the selected device on the touch screen 111 (S313). Preferably, the device UI displayed on the touch screen 111 is the same as the UI displayed on the display unit of the device. In response to an action of the user using the displayed device UI, the control unit 117 controls the selected device (S315). At this step, because the selected device is controlled through the device UI displayed on the touch screen 111, the user can accurately and finely control the device in various manners. In particular, the control unit 117 enables the user to control the device using a scrolling operation, mouse operation, and touch operation.

When a termination request for device control is issued (S317), the control unit 117 ends the process.

If a registered device is present at step S303, the control unit 117 finds a list of registered devices and displays the list on the touch screen 111 (S319). If a registered device is present, the control unit 117 displays on the touch screen 111 device information stored in the device information section 107 of the memory unit 105. At this time, a sign can be displayed to indicate that a device UI for the registered device is stored in the UI information section 109 of the memory unit 105.

The control unit 117 checks whether a device on the list is selected by the user for control (S321). If no device is selected, the control unit 117 proceeds to step S305 (described earlier), permitting the user to select another device. If a device is selected, the control unit 117 proceeds to step S311 (described earlier).

Figure 3B:
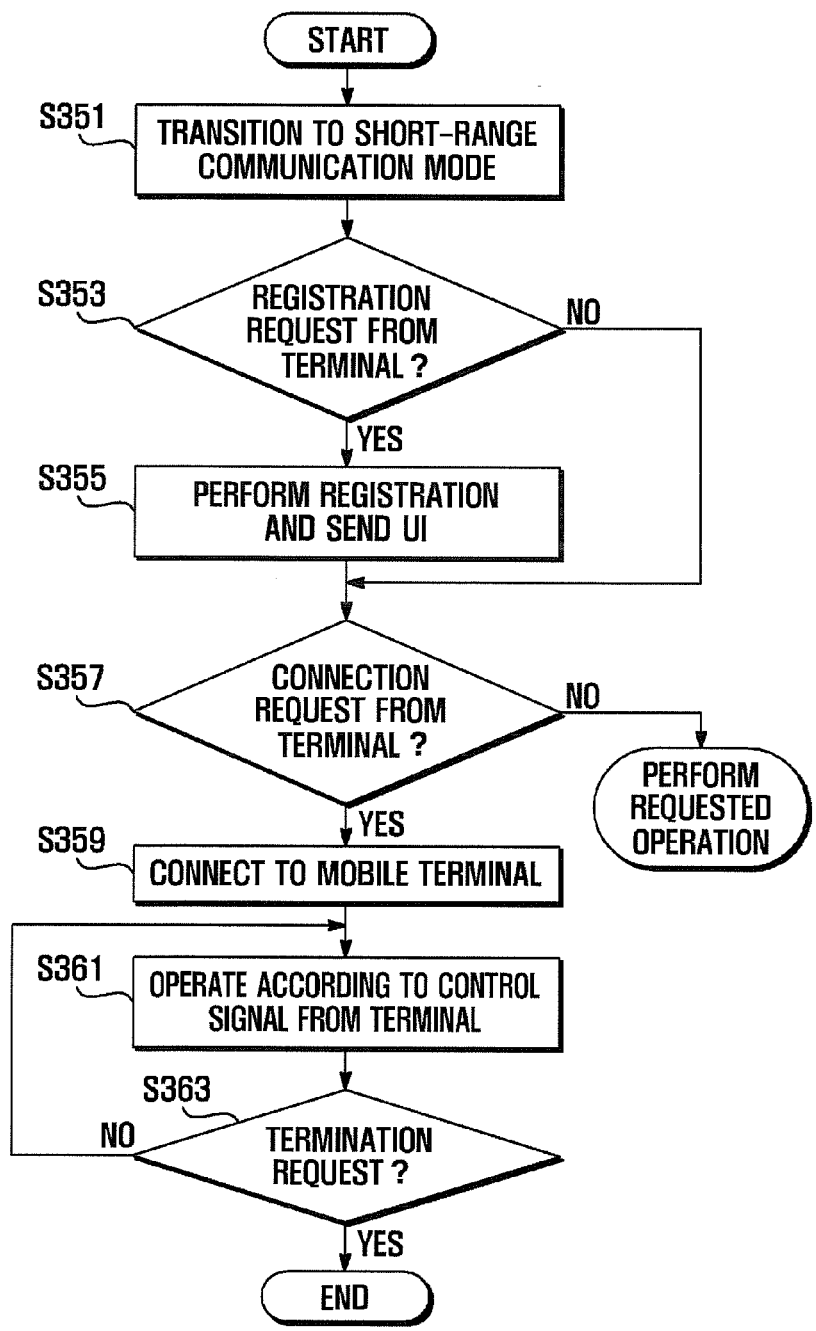
FIG. 3B is a flowchart illustrating a sequence of operations performed by an electronic device under the control of the mobile terminal of FIG. 3A.

Next, the operations of a device controlled using the device control method is described. FIG. 3B is a flowchart illustrating a sequence of operations performed by an electronic device 200 under the control of the mobile terminal 100 of FIG. 3A.

Referring to FIGS. 2 and 3B, the control unit 211 of the device 200 transitions to a short-range communication mode (S351). In the present embodiment, the device 200 may transition to the short-range communication mode upon powering on. The short-range wireless communication module 201 is described as a Bluetooth module.

The control unit 211 checks whether a registration request is received from the mobile terminal 100 (S353). If a registration request is received, the control unit 211 performs a registration operation and sends the UI of the device 200 to the mobile terminal 100 (S355). The control unit 211 of the device 200 sends the UI stored in the UI information section 207 during registration. Step S355 corresponds to step S303 in FIG. 3A, where a registered device is not present.

If a registration request is not received, the control unit 211 checks whether a connection request is received from the mobile terminal 100 (S357). Step S357 corresponds to step S303 in FIG. 3A, where the device 200 is already registered in the mobile terminal 100.

If a connection request is received, the control unit 211 connects to the mobile terminal 100 through short-range wireless communication (S359). After connection establishment, the control unit 211 operates according to control signals from the mobile terminal 100 (S361).

If a request other than a connection request is received at step S357, the control unit 211 performs the requested operation.

When a termination request is issued (S363), the control unit 211 ends the process.

Figure 4:
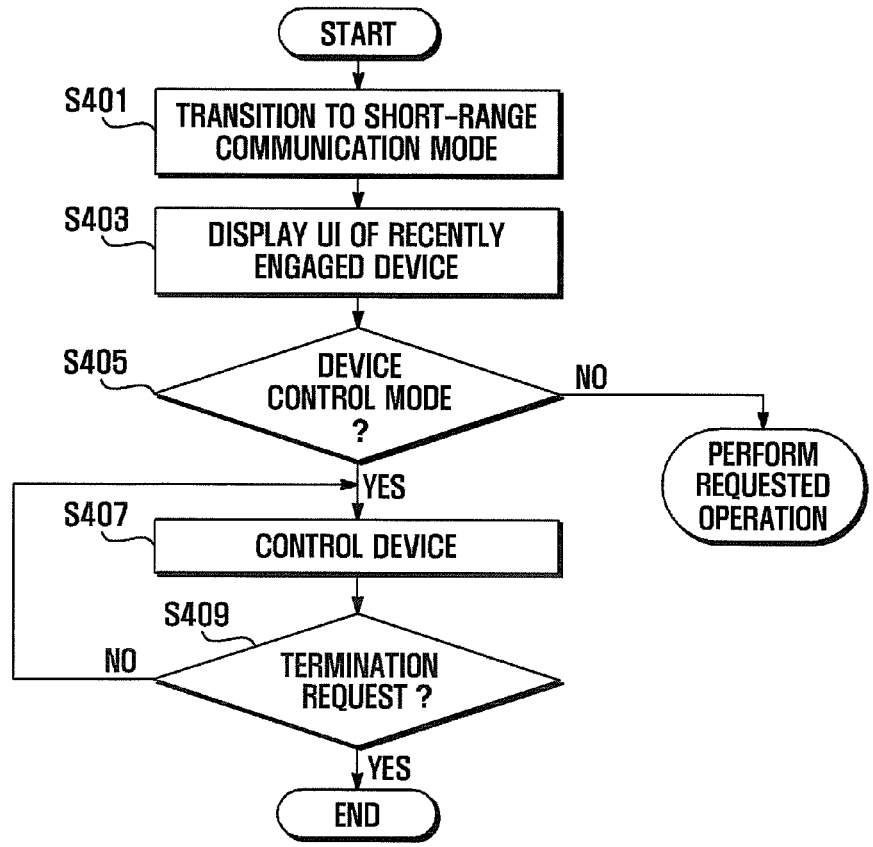
FIG. 4 is a flowchart illustrating an alternative procedure performed by the mobile terminal for device control.

Next, an alternative procedure for the operation of the mobile terminal 100 for device control is described. FIG. 4 is a flowchart illustrating another sequence of operations performed by the mobile terminal for device control.

Referring to FIGS. 2 and 4, in response to a request from the user, the control unit 117 of the mobile terminal 100 transitions to the short-range communication mode (S401). The control unit 117 activates the short-range wireless communication module 101 to transition to the short-range communication mode.

The control unit 117 displays on the touch screen 111 the UI of a device recently engaged in short-range wireless communication (S403). Hence, the user can control again a recently controlled device using the mobile terminal 100. Immediate display of the UI of a device recently engaged in short-range wireless communication after transitioning to the short-range communication mode may enhance user convenience. For the user refusing to use the displayed device UI, the control unit 117 provides on the touch screen 111 a menu item such as a back key enabling transition to the default screen of the short-range communication mode. The menu item may be displayed as a soft key.

The control unit 117 checks whether a device control mode is selected by the user (S405). The user may control the recently controlled device using the displayed device UI.

If the device control mode is selected, the control unit 117 controls the device (S407). The control unit 117 enables the user to control the device using a scrolling operation, mouse operation, and touch operation. When a termination request for the device control mode is issued (S409), the control unit 117 ends the process.

If a device control mode is not selected at step S405, the control unit 117 performs an operation according to a user request. For example, the user may input a back key represented as a soft key to direct the control unit 117 to perform an operation like step S303 in FIG. 3 for selecting a desired device.

Figure 5:
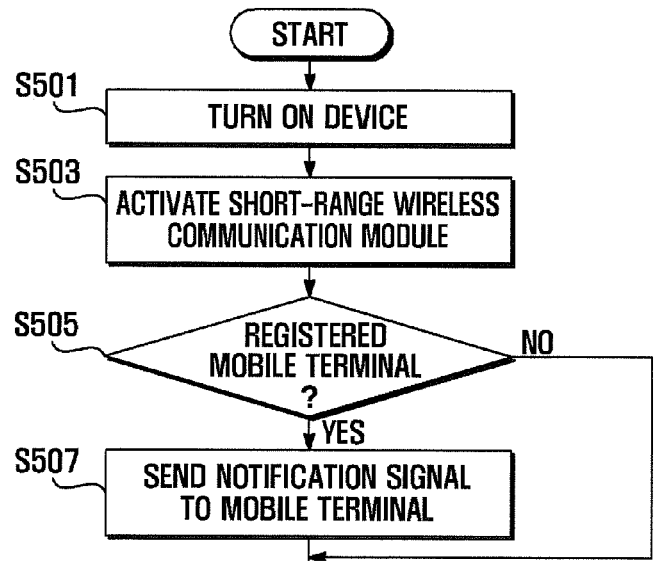
FIG. 5 is a flowchart illustrating an alternative procedure for the operation of a controlled device.

Next, an alternative procedure for the operation of a controlled device is described. FIG. 5 is a flowchart illustrating an alternative procedure for the operation of a controlled device.

Referring to FIGS. 1, 2 and 5, when the user turns on the device 200 (S501), the device 200 activates the short-range wireless communication module 201 (S503).

The device 200 checks for the presence of a registered mobile terminal 100 (S505). At this step, the device 200 finds a mobile terminal 100 that was once connected through short-range wireless communication, and checks whether the mobile terminal 100 is present within the range of short-range wireless communication.

If a registered mobile terminal 100 is present, the device 200 sends a notification signal to the mobile terminal 100 (S507). When the device 200 is turned on and a registered mobile terminal 100 is present, the device 200 can inform the user of the location of the mobile terminal 100 by sending a notification signal to the mobile terminal 100. Hence, the user can readily find the mobile terminal 100 and conveniently use the same to control the device 200. In other words, the device 200 sends a connection request for short-range wireless communication to the mobile terminal 100 and the control unit 117 accepts the connection request, and thus the user can control the operation of the device 200 using the mobile terminal 100.

Descriptions of the operations of the mobile terminal and the device in FIGS. 4 and 5 correspond to the embodiment described in FIGS. 3A and 3B, and may also be applicable to embodiments to be described later.

Figure 6:
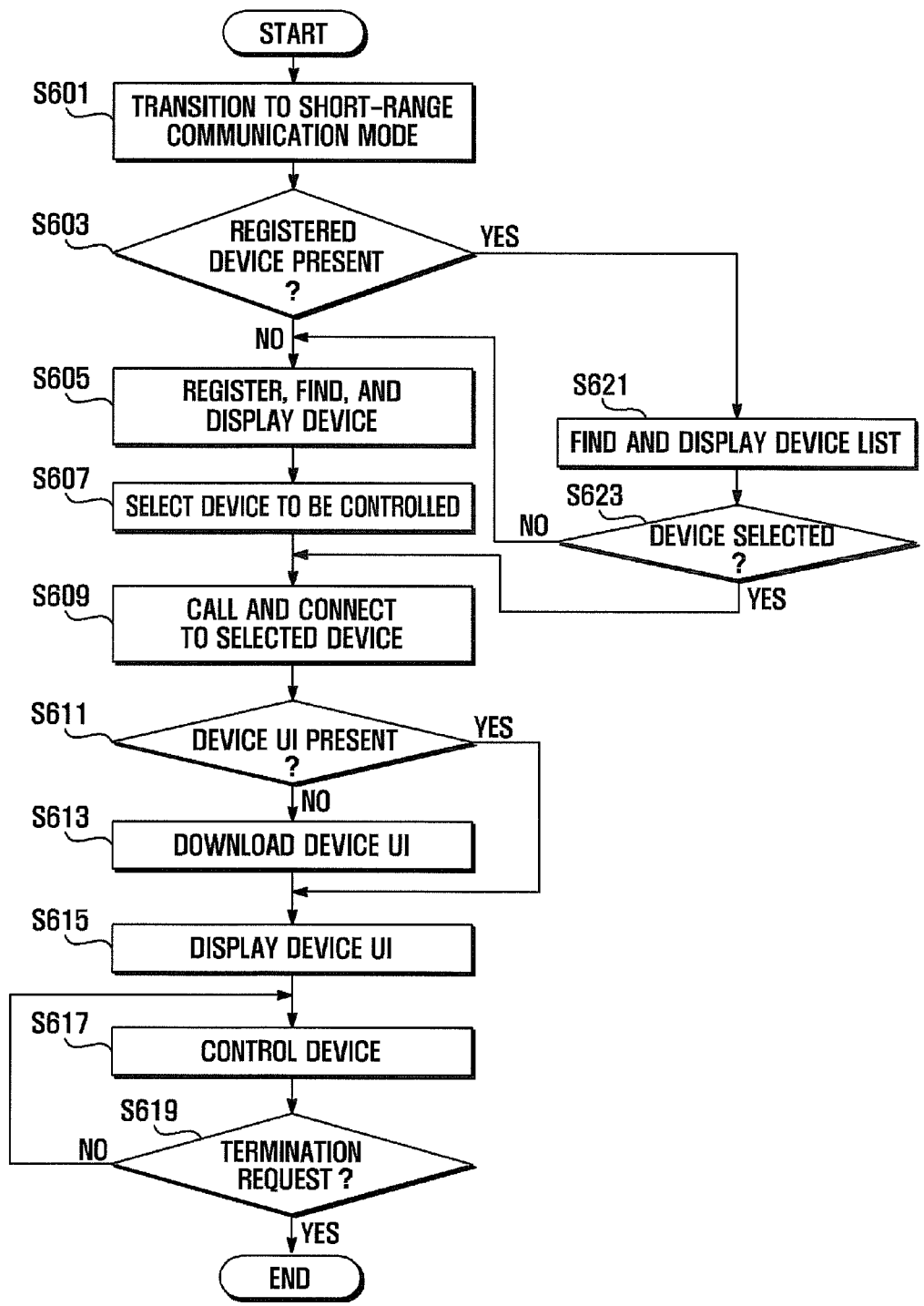
FIG. 6 is a flowchart illustrating a device control method of a mobile terminal according to another exemplary embodiment of the present invention.

Next, another device control method of a mobile terminal is described. FIG. 6 is a flowchart illustrating a device control method of a mobile terminal according to another exemplary embodiment of the present invention.

Elements of the present embodiment that are the same as or correspond to those of the embodiment of FIG. 3A are not described. The embodiment of FIG. 6 is similar to that of FIG. 3A. In the embodiment of FIG. 3A, a device UI is downloaded at the time of device registration during the short-range communication mode. In the embodiment of FIG. 6, a particular device is selected and connected through short-range wireless communication and then the UI of the device is downloaded.

Referring to FIG. 2, the control unit 117 displays on the touch screen 111 the UI of a device that is selected during the short-range communication mode and connected through short-range wireless communication. If the selected device is a registered one, the control unit 117 displays the device UI stored in the UI information section 109 of the memory unit 205. If the selected device is a device connected for the first time, the control unit 117 downloads the UI of the device and displays the downloaded device UI.

Referring to FIG. 6, in response to a request from the user, the control unit 117 of the mobile terminal 100 transitions to the short-range communication mode (S601).

The control unit 117 checks for the presence of a registered device (S603). If a registered device is not present, the control unit 117 registers a device capable of short-range wireless communication, and finds a list of registered devices and displays the list (S605). The control unit 117 selects a device from the list to be controlled according to a user input (S607). When a list of registered devices capable of short-range wireless communication is displayed, the user selects a device from the list to be controlled. Thereafter, the control unit 117 calls the selected device and connects to the device through short-range wireless communication (S609).

The control unit 117 checks whether the UI of the selected device is present (S611). The UI of the selected device may be stored in the UI information section 109 of the memory unit 105. If the UI of the selected device is present, the control unit 117 proceeds to step S615.

If the UI of the selected device is not present, the control unit 117 downloads the UI from the device connected through short-range wireless communication (S613). This device is connected through short-range wireless communication with the mobile terminal 100 for the first time. The mobile terminal 100 does not store the device UI and UI function information in order to control the device. Hence, at the time of connection through short-range wireless communication, the device sends its UI to the mobile terminal 100. The control unit 117 stores the download device UI, and may discard the device UI later.

Thereafter, the control unit 117 displays the UI of the selected device on the touch screen 111 (S615). In response to an action of the user using the displayed device UI, the control unit 117 controls the selected device (S617). Because device control is performed through the device UI displayed on the touch screen 111, the user can accurately and finely control the device in various manners using a scrolling operation, mouse operation, and touch operation.

When a termination request for device control is issued (S619), the control unit 117 ends the process.

If a registered device is present at step S603, the control unit 117 finds a list of registered devices and displays the list on the touch screen 111 (S621). If a registered device is present, the control unit 117 displays on the touch screen 111 device information stored in the device information section 107 of the memory unit 105. At this time, a sign can be displayed to indicate that a device UI for the registered device is stored in the UI information section 109 of the memory unit 105.

The control unit 117 checks whether a device on the list is selected by the user for control (S623). If no device is selected, the control unit 117 proceeds to step S605 (described earlier), permitting the user to select another device. If a device is selected, the control unit 117 proceeds to step S609 (described earlier).

Figure 7:
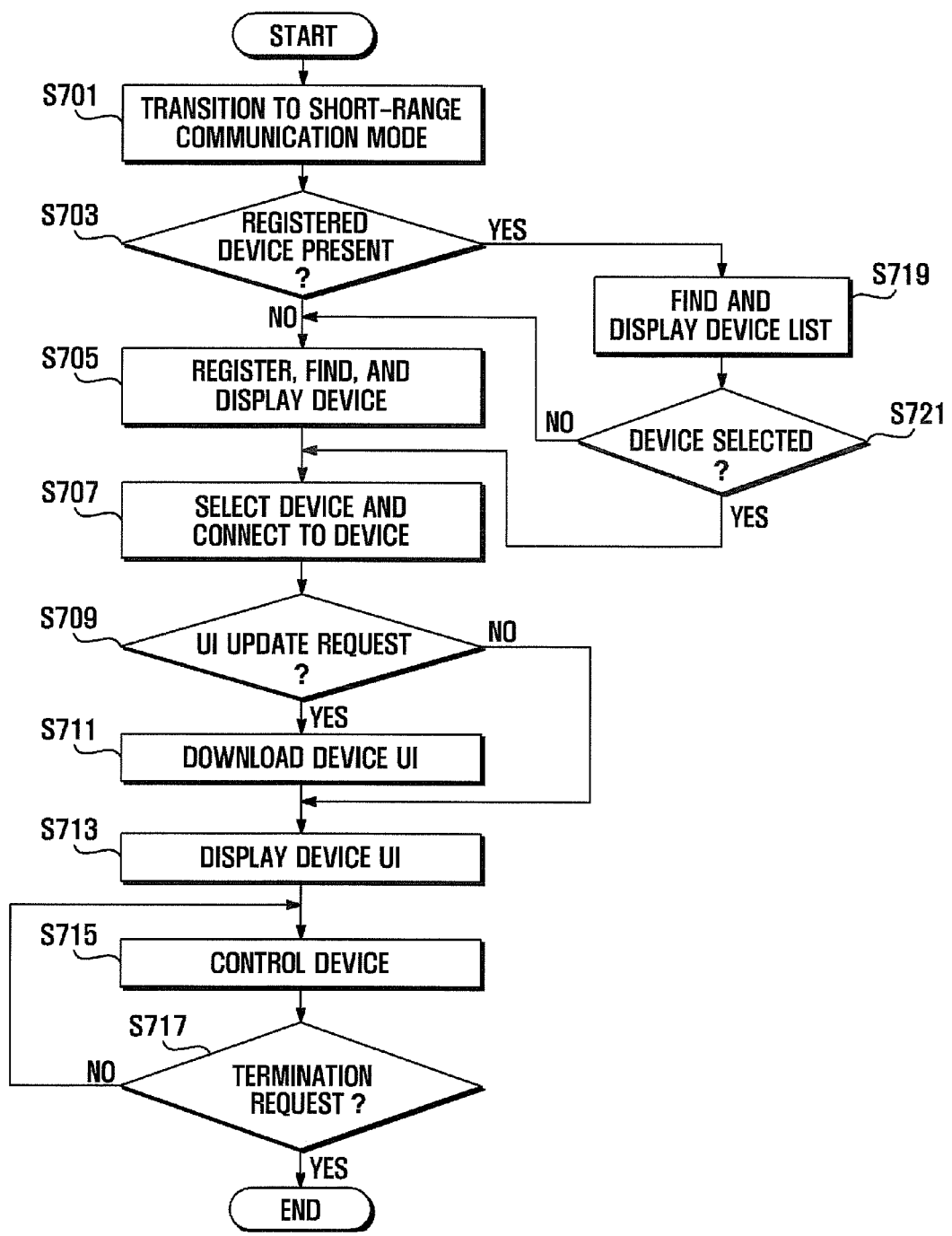
FIG. 7 is a flowchart illustrating a device control method of a mobile terminal according to another exemplary embodiment of the present invention.

Next, another device control method of a mobile terminal is described. FIG. 7 is a flowchart illustrating a device control method of a mobile terminal according to another exemplary embodiment of the present invention.

Elements of the present embodiment that are the same as or correspond to those of the embodiments of FIG. 3A and 6 are not described. The embodiment of FIG. 7 is similar to those of FIGS. 3A and 6. In the embodiment of FIG. 7, the UI of the device is not downloaded but pre-stored in the mobile terminal.

Referring to FIG. 2, in the memory unit 105, information on devices capable of short-range wireless communication is stored in the information section 107, and UIs of the devices are stored in the UI information section 109. That is, the device information and UIs are not downloaded from corresponding devices, but are pre-stored in the memory unit 105 of the mobile terminal 100 before shipment. The device and UI information can occupy a significant percentage of the capacity of the memory unit 105, and only basic versions of the device UIs may be stored. In this case, a device UI may be updated whenever the corresponding device is connected to the mobile terminal 100 through short-range wireless communication.

Referring to FIG. 7, in response to a request from the user, the control unit 117 of the mobile terminal 100 transitions to the short-range communication mode (S701).

The control unit 117 checks for the presence of a registered device (S703). The control unit 117 checks for the presence of a registered device that has been connected so far through short-range wireless communication.

If a registered device is not present, the control unit 117 registers a device capable of short-range wireless communication, and finds a list of registered devices and displays the list on the touch screen 111 (S705). The control unit 117 selects a device from the list to be controlled according to a user input, and connects to the selected device through short-range wireless communication (S707).

The control unit 117 checks whether a UI update request is received (S709). Upon connection through short-range wireless communication with a device, the device may send a UI update request. Because of the capacity limit of the memory unit 105, a stored device UI may be only a basic version. For fine device control as in the embodiments of FIG. 3A and 6, the control unit 117 can download a device UI from a device capable of short-range wireless communication.

If a UI update request is received, the control unit 117 downloads a device UI from the device connected through short-range wireless communication (S711). The downloaded device UI may be stored in the UI information section 109 of the memory unit 105. If a UI update request is not received, the control unit 117 proceeds to step S713.

Thereafter, the control unit 117 displays the UI of the connected device on the touch screen 111 (S713). Here, the displayed device UI is a newly updated version when step S711 of device UI downloading is performed, or is a basic version pre-stored in the memory unit 105 before shipment when step S711 is not performed.

In response to an action of the user using the displayed device UI, the control unit 117 controls the selected device (S715). Because device control is performed through the device UI displayed on the touch screen 111, the user can accurately and finely control the device in various manners using a scrolling operation, mouse operation, and touch operation.

When a termination request for device control is issued (S717), the control unit 117 ends the process.

If a registered device is present at step S703, the control unit 117 finds a list of registered devices and displays the list on the touch screen 111 (S719).

The control unit 117 checks whether a device on the list is selected by the user for control (S721). If no device is selected, the control unit 117 proceeds to step S705 (described earlier), permitting the user to select another device. If a device is selected, the control unit 117 proceeds to step S707 (described earlier).

The mobile terminal and device control method for the same may be modified in various manners. For example, in the embodiments of FIGS. 3A and 6, device information and UI of a device are stored and the device is controlled using the stored device UI. However, the present invention is not limited thereto. For a registered device, upon establishment of a connection through short-range wireless communication, the mobile terminal may send a UI update request to the device or the device may send a UI update request to the mobile terminal. Thus, the mobile terminal enables the user to control a device using newly updated device UI whenever the mobile terminal is connected through short-range wireless communication to the device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method comprising:
    registering, at a first device capable of wireless communication, a second device;
    receiving at the first device, a notification from the second device, wherein the notification is generated in response to a determination at the second device that the first device has previously been registered with the second device and in response to a determination at the second device that at least one of the first device or the second device is powered on; and
    providing, via the first device, an indication of a location of the first device in response to receiving the notification.

2. The method of claim 1, further comprising:
    registering one of the first device and the second device with another device of the same type as one of the first device and the second device prior to the determination at the second device that at least one of the first device or the second device is powered on.

3. The method of claim 2, wherein registering comprises:
    storing user interference (UI) information of the second device on the first device.

4. The method of claim 1, further comprising:
    establishing a communication connection between the first device and the second device in response to identifying the first device.

5. The method of claim 1, further comprising:
    controlling the second device using the first device based at least in part on user interface (UI) information of the second device.

6. The method of claim 5, further comprising:
    receiving, by the first device, the UI information from the second device.

7. The method of claim 5, wherein controlling comprises:
    displaying, via the first device, at least a portion of the UI information.

8. The method of claim 1, wherein presenting the indication comprises:
    receiving, by the first device, at least a portion of the indication from the second device.

9. The method of claim 1, wherein the indication comprises an alert signal.

10. The method of claim 1, wherein the first device is a device that has most recently engaged in short-range communication.

11. An apparatus comprising:
    a memory unit configured to store location information; and
    a control unit configured to:
        register a device capable of wireless communication;
        receive a notification from the device, wherein the notification is generated in response to a determination at the device that the apparatus has previously been registered with the device and in response to a determination at the device that at least one of the apparatus or the device is powered on; and
        provide an indication of a location of the apparatus in response to receiving the notification in order to enable a user to locate the apparatus.

12. The first apparatus of claim 11, wherein the control unit is further configured to:
    display a list of registered apparatuses capable of wireless communication when at least one registered apparatus is present.

13. The first apparatus of claim 12, wherein the control unit is further configured to:
    receive a selection of the second apparatus from the list and establish a communication connection between the second apparatus and the first apparatus.

14. The first apparatus of claim 13, wherein the selection is received using a touch operation.

15. The first apparatus of claim 13, wherein the control unit is further configured to:
    receive user interface (UI) information of the second apparatus and store the UI information in the memory unit.

16. The first apparatus of claim 11, wherein the control unit is further configured to:
    control the second apparatus based at least in part on user interface (UI) information of the second apparatus.

17. The apparatus of claim 11, wherein the control unit is further configured to:
    establish a communication connection between the first apparatus and the second apparatus.

18. The apparatus of claim 11, wherein the indication comprises an alert signal.

19. A non-transitory, computer-readable medium comprising one or more executable instructions that, when executed by one or more processors, cause the one or more processors to:
    register, at a first device capable of wireless communication, a second device;
    receive, at the first device, a notification from the second device, wherein the notification is generated in response to a determination at the second device that the first device has previously been registered with the second device and in response to a determination at the second device that at least one of the first device or the second device is powered on; and
    provide, via the first device, an indication of a location of the first device in response to receiving the notification.

20. The medium of claim 19, wherein the one or more executable instructions are further configured to cause the one or more processors to:
    display, on a user interface (UI) of the first device, one or more devices that the first device has recently established communication connections.

21. The storage device of claim 19, wherein the indication comprises an alert signal.

* * * * *